(12) United States Patent
Hunacek

(10) Patent No.: US 10,700,857 B2
(45) Date of Patent: Jun. 30, 2020

(54) SECURE PROGRAMMING OF SECRET DATA

(71) Applicant: NAGRAVISION S.A., Cheseaux-sur-Lausanne (CH)

(72) Inventor: Didier Hunacek, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 193 days.

(21) Appl. No.: 16/075,109

(22) PCT Filed: Jun. 29, 2016

(86) PCT No.: PCT/EP2016/065225
§ 371 (c)(1),
(2) Date: Aug. 2, 2018

(87) PCT Pub. No.: WO2017/001530
PCT Pub. Date: Jan. 5, 2017

(65) Prior Publication Data
US 2019/0044715 A1 Feb. 7, 2019

(30) Foreign Application Priority Data
Jun. 29, 2015 (GB) .................................. 1511385.5

(51) Int. Cl.
H04L 9/00 (2006.01)
H04L 9/08 (2006.01)
(Continued)

(52) U.S. Cl.
CPC .......... H04L 9/0866 (2013.01); H04L 9/0825 (2013.01); H04L 9/0877 (2013.01);
(Continued)

(58) Field of Classification Search
USPC .......................................................... 380/44
See application file for complete search history.

(56) References Cited

U.S. PATENT DOCUMENTS 6,134,660 A * 10/2000 Boneh ................. G06F 21/6209
380/201
7,380,131 B1 * 5/2008 Trimberger ........... H04L 9/0866
326/41
(Continued)

FOREIGN PATENT DOCUMENTS

| WO | 2011/089143 A1 | 7/2011 |
| WO | 2015/038690 A1 | 3/2015 |

OTHER PUBLICATIONS

International Search Report and Written Opinion for related PCT application No. PCT/EP2016/065225, dated Sep. 22, 2016, in 11 pages.

Primary Examiner — Amare F Tabor
(74) Attorney, Agent, or Firm — Oblon, McClelland, Maier & Neustadt, L.L.P.

(57) ABSTRACT

Secure Programming of Secret data A method is provided. The method comprises providing a device comprising a secure element coupled to a non-volatile memory, the non-volatile memory comprising a first cryptographic key stored therein; the secure element decrypting and authenticating first secret data using the first cryptographic key to form second secret data; and then rendering the true value of the first cryptographic key unreadable.

13 Claims, 2 Drawing Sheets

(51) Int. Cl.
*H04L 9/14* (2006.01)
*H04L 9/32* (2006.01)

(52) U.S. Cl.
CPC .............. *H04L 9/14* (2013.01); *H04L 9/3234* (2013.01); *H04L 9/3278* (2013.01)

(56) References Cited

U.S. PATENT DOCUMENTS

| | | | | |
|---|---|---|---|---|
| 7,395,165 | B2* | 7/2008 | Buhr | G06F 21/79 |
| | | | | 702/108 |
| 7,814,318 | B1* | 10/2010 | Perlman | G06F 21/6209 |
| | | | | 380/277 |
| 8,700,899 | B1* | 4/2014 | Juels | H04L 9/0891 |
| | | | | 380/30 |
| 9,633,210 | B2* | 4/2017 | Ferguson | G06F 21/602 |
| 2003/0093684 | A1* | 5/2003 | Kaiserswerth | H04L 63/0428 |
| | | | | 713/193 |
| 2010/0100747 | A1* | 4/2010 | Boscher | G09C 1/00 |
| | | | | 713/187 |
| 2011/0035599 | A1* | 2/2011 | Henry | G06F 21/73 |
| | | | | 713/189 |
| 2013/0051552 | A1* | 2/2013 | Handschuh | G06F 21/602 |
| | | | | 380/44 |

* cited by examiner

SECURE PROGRAMMING OF SECRET DATA

This invention relates to the provision of secure programming of secret data. It is particularly suitable for, but by no means limited to, programming of secret data at the time of manufacture or final programming of a system-on-chip device.

BACKGROUND

When a device such as a system-on-chip device is manufactured, it may be personalised with secret data, for example encryption keys, passwords and/or other confidential data. Typically, the manufacturer of the device embeds the secret data at the time of wafer creation, or just before packaging the device. The secret data therefore must be available to the manufacturer, and this can cause security concerns in that the data may become divested to parties who should not have access to the data through security breaches or unscrupulous activity. One way of mitigating this risk is to provide the manufacturer with a 'black box' that is able to decrypt secret data that has been pre-encrypted by a secret data provider and communicate with the manufacturer's programming system in order that the secret data be released at the appropriate time for embedding onto the device.

Such a 'black box' is a costly system to maintain and operate. One way of proceeding without the use of the 'black box' is to decrypt the encrypted secret data directly on the device in question at the time of final packaging. This can be achieved by way of a specific module implemented on the device which may be a secure element. The secure element has knowledge of custom algorithms and one or more specific encryption/decryption keys known only to the secret data provider to decrypt the secret data. Further, only a generic algorithms and key(s) set could be used as it would too costly and impractical to deliver a separate set for each device to be programmed. The secure element may be delivered to the manufacturer by the secret data provider in the form of a netlist. The netlist is incorporated into the device design.

Such a secret data delivery and device programming scheme relies on the netlist remaining confidential. If the netlist were to become available to an unauthorised party, the algorithm and secret encryption/decryption keys would be usable to decrypt the secret data. The netlist is hence a single point of failure, and therefore a security risk.

It is therefore desirable to provide alternative programming of secret data having greater security.

SUMMARY

According to a first aspect there is provided a method as defined in claim 1. This there is provided a method comprising providing a device comprising a secure element coupled to a non-volatile memory, the non-volatile memory comprising a first cryptographic key stored therein, the secure element decrypting and authenticating first secret data using the first cryptographic key to form second secret data; and then rendering the true value of the first cryptographic key unreadable.

Optionally, the method further comprising the secure element encrypting and signing the second secret data using a second cryptographic key known only to the secure element to form third secret data, and storing the third secret data in the non-volatile memory.

Optionally, the method further comprising the secure element deriving the first cryptographic key by decrypting and authenticating cryptographic key data with a key that is hardwired into the secure element.

Optionally, the method further comprising the secure element writing the first cryptographic key into the non-volatile memory.

Optionally, the method further comprising storing the first secret data in the non-volatile memory prior to decryption and authentication.

Optionally, the method further comprising the secure element rendering the true value of the first secret data unreadable by irreversibly change at least a portion of the first data stored in the non-volatile memory.

Optionally, the method further comprising the secure element providing the second cryptographic key from a physically unclonable function contained therein.

Optionally, the method further comprising the secure element rendering the true value of the first cryptographic key unreadable by irreversibly changing at least a portion of the first cryptographic key by changing the state of at least one bit of the first cryptographic key and then locking the stored first cryptographic key to prevent further changes.

Optionally, the method further comprising the secure element decrypting and authenticating the third secret data using the second cryptographic key.

Optionally, the method wherein the non-volatile memory comprises a one-time programmable memory.

Optionally, the method wherein the non-volatile memory is only accessible by the secure element.

Optionally, the method wherein the device is an SoC device.

According to a second aspect there is provided a device as defined in claim 10 of the appended claims. Thus there is provided a device comprising a secure element coupled to a non-volatile memory, the non-volatile memory arranged to hold a first cryptographic key stored therein, the secure element configured to, decrypt and authenticate first secret data using the first cryptographic key to form second secret data and then render the true value of the first cryptographic key unreadable.

Optionally, the device wherein the secure element is further configured to encrypt and sign the second secret data using a second cryptographic key known only to the secure element to form third secret data and store the third secret data in the non-volatile memory.

Optionally, the device wherein the secure element is further configured to derive the first cryptographic key by decrypting and authenticating cryptographic key data with a key that is hardwired into the secure element.

Optionally, the device wherein the secure element is further configured to write the first cryptographic key into the non-volatile memory.

Optionally, the device wherein the first secret data is stored in the non-volatile memory prior to decryption and authentication.

Optionally, the device wherein the secure element is further configured to render the true value of the first secret data unreadable by irreversibly changing at least a portion of the first data stored in the non-volatile memory.

Optionally, the device wherein the secure element is further configured to provide the second cryptographic key from a physically unclonable function contained therein.

Optionally, the device wherein the secure element is configured to render the true value of the first cryptographic key unreadable by irreversibly changing at least a portion of the first cryptographic key by changing the state of at least one bit of the first cryptographic key and then locking the stored first cryptographic key to prevent further changes.

Optionally, the device wherein the secure element is further configured to decrypt and authenticate the third secret data using the second cryptographic key.

Optionally, the device wherein the non-volatile memory comprises a one-time programmable memory.

Optionally, the device wherein the non-volatile memory is only accessible by the secure element.

Optionally, the device is an SoC device.

According to a third aspect there is provided a computer readable medium as defined in claim 14. Thus there is provided a computer readable medium comprising instructions that when executed, cause a processor to perform any of the methods disclosed herein.

With all the aspects, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

OVERVIEW

Disclosed herein is a device 10 comprising non-volatile memory which may be any device capable of being programed with secret data, for example a PLD (programmable logic device), FPGA (field programmable gate array) or SoC (system-on-chip). Secret data is provided that is encrypted with a provider key by the secret data provider. The secret data is decrypted on the device in a manner so that a) the provider key and secret data are never available outside of the device in an unencrypted state, and b) once the secret data has been installed, the provider key is rendered unreadable so that unscrupulous attacks on the device cannot discover the key.

The secret data is decrypted from the initial delivery state using the provider key and may be stored locally within the device in a device encrypted form where the device encryption key is unique and known only to the device.

With the disclosed device and method, a single point of failure is removed in that both the device netlist and provider key must be available in order to decode the secret data. Further, by using a device encryption key which is unique to the device, even if the unscrupulous party has gained access to the device netlist and can read the device encrypted data, there is no way to discover the device encryption key which is created internal to the device whenever required. Moreover, even if the provider key is discovered by an unscrupulous party, it could be changed for future production of the device such that the security breach be minimised.

DETAILED DESCRIPTION

Figure 1:
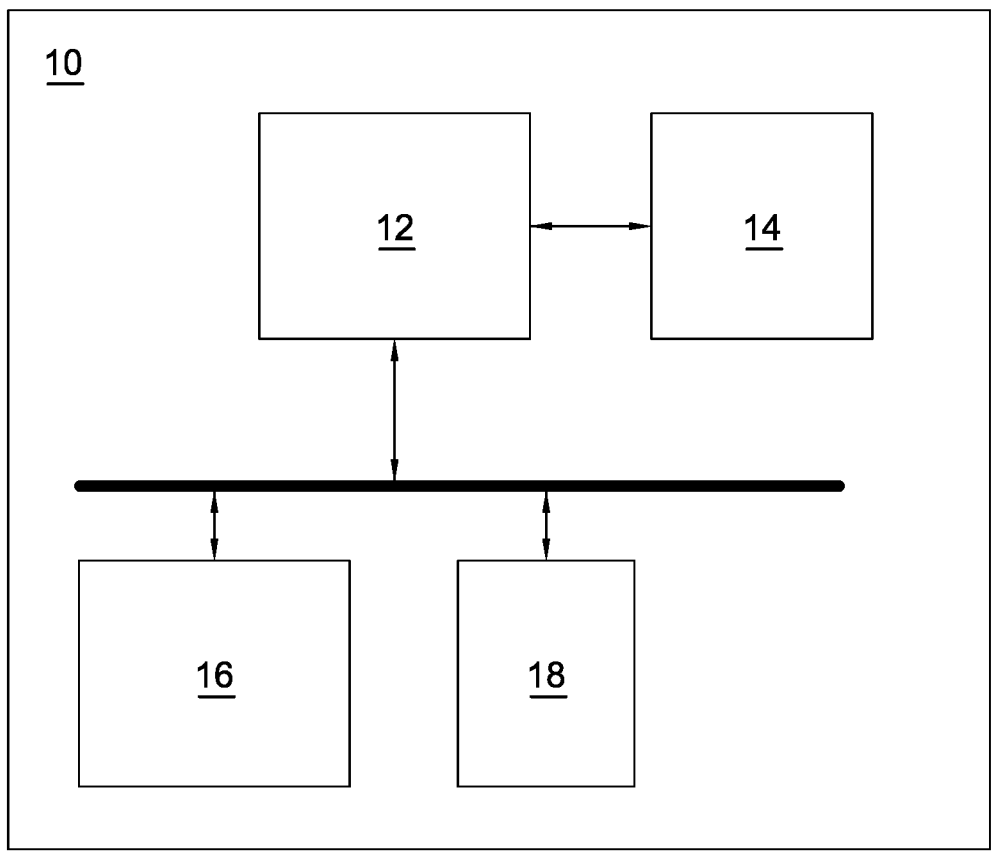
FIG. 1 illustrates a secure device according to an embodiment.

Turning to FIG. 1, a device 10 comprises secure element 12 and non-volatile memory 14. The non-volatile memory may be a one-time programmable memory and may be arranged to hold a first cryptographic key. The device may also comprise a CPU 16, and one or both of ROM 18 and external RAM (not shown). The various constituent parts of device 10 may communicate with one another over a bus structure as illustrated. Secure element 12 may be the only part of device 10 that can communicate with the non-volatile memory 14.

Methods of securely providing secret data to and securely decrypting secret data on the device 10 will now be described.

Figure 2:
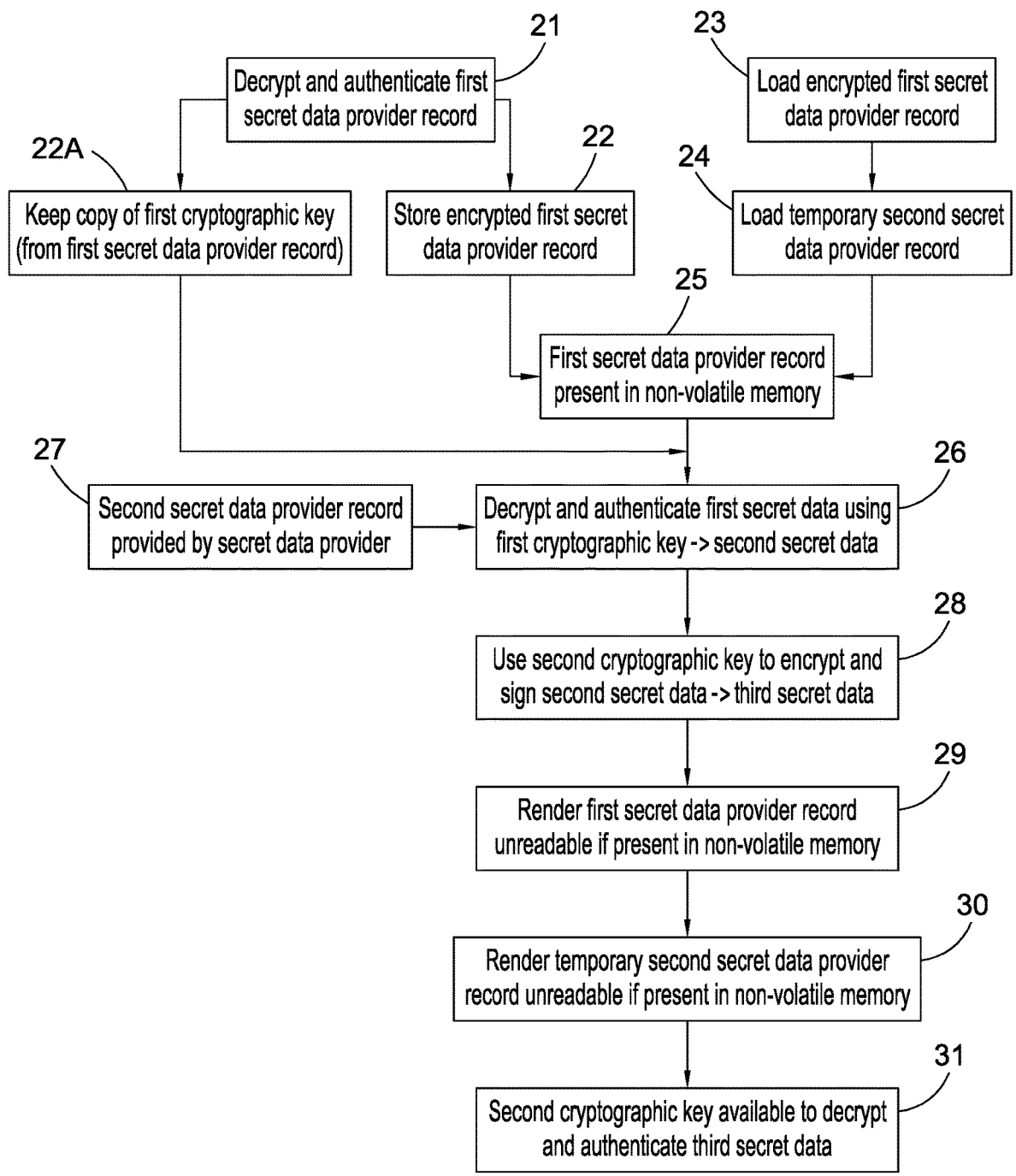
FIG. 2 illustrates methods according to embodiments.

With reference to FIG. 2, at step 25, a first secret data provider record comprising a first cryptographic key (provided by the secret data provider) is loaded into the non-volatile memory 14. As shown in FIG. 2, the first cryptographic key may be loaded into the non-volatile memory (by way of the first secret data provider record) in one of two ways. In some embodiments as shown in steps 21 and 22, the secure element 12 loads the first cryptographic key into the non-volatile memory, and in other embodiments as shown in steps 23 and 24, the device manufacturer or other party loads the first cryptographic key into the non-volatile memory without secure element 12 involvement.

At device manufacture, the netlist for the secure element 12 may comprise a hard-wired cryptographic key and an optional hard-wired custom decryption/encryption algorithm. In this context, hard-wired refers to the data in question being unmodifiable.

In step 21, the hard-wired cryptographic key and optional decryption/encryption algorithm may be used by the secure element 12 to decrypt and authenticate the first secret data provider record comprising the first cryptographic key. Step 21 may be carried out the first time the device is powered up. If the first secret data provider record comprising the first cryptographic key is successfully decrypted and authenticated, at step 22 the first secret data provider record is stored in the non-volatile memory 14 by the secure element 12 in its encrypted form.

In alternative steps 23 and 24, at step 23, the device manufacturer loads the first secret data provider record comprising the first cryptographic key into the non-volatile memory 14 without secure element 12 involvement, and in an encrypted state. The decryption of this may be done by the hard-wired cryptographic key. In step 24, the device manufacturer loads a temporary second secret data provider record comprising first secret data also in non-volatile memory 14. The second secret data provider record is encrypted and signed using the first cryptographic key of the first secret data provider record. In either or both of steps 23 and 24, the device manufacturer may use a dedicated hardware programming path (not shown in FIG. 1). After carrying out the required loading of data, the hardware programming path may be permanently disabled by hardware means such as deactivating the path by blowing related fuses and/or software means by programming bits into the non-volatile memory so that access to the non-volatile memory external to the device is no longer possible.

Following either steps 21 and 22, or 23 and 24, at step 25, the first secret data provider record comprising the first cryptographic key is present in non-volatile memory 14 in an encrypted state.

In an alternative, after step 21, at step 22A, if the first secret data provider record comprising the first cryptographic key is successfully decrypted and authenticated, the secure element may keep a copy of the first cryptographic key and then step 26 is carried out without the first cryptographic key (comprised in the first secret data provider record) being stored in the non-volatile memory 14. The copy of the first cryptographic key may be a local transient copy.

At step 26, which may occur after a reset of the device, secure element 12 decrypts and authenticates first secret data using the first cryptographic key (in decrypted form) to form second secret data. First secret data may be present in the non-volatile memory by way of optional step 24 (from the temporary second secret data provider record previously available), or the second secret data provider record may be provided separately by a secret data provider at optional step 27.

In step 28, if the decryption and authentication of the first secret data to form second secret data is successful, secure element 12 uses a second cryptographic key known only to the secure element to encrypt and sign the second secret data to form third secret data. The secure element then stores the third secret data in the non-volatile memory 14. The algorithm used with the second cryptographic key to form third secret data may be different to the algorithm present in the secure element and used in step 21 to decrypt the first data provider record.

The second cryptographic key which is known only to the secure element 12 may be generated by a physically unclonable function (PUF) present in the device. The PUF may be available to the cryptographic algorithm present in the secure element and known only to the algorithm with the secure element being unable to read the PUF. The second cryptographic key may be generated at each reset by the PUF. Details of the mechanism of how the PUF operates can be found in US2014/0376717 and EP2816757 "method and unique cryptographic device with a physically unclonable function", the contents of which are incorporated by reference herein. As will be understood, the physically unclonable function produces the second cryptographic key which is unique to the particular device upon which it resides and which cannot be cloned even by way of device inspection with a microscope, or other means of inspection. This is because the imperceptible manufacturing differences which are used to generate the second cryptographic key are not reproducible or predictable. As manufacturing processes are imperfect, an involuntary personalization of components within the device occurs which can be transformed into useful information that may be used to produce unique identifiers. Hence a PUF is provided where, for example, a pseudo-random bit sequence can represent the information derived from the imperceptible differences as would be understood. This may, in turn, be used to create a unique cryptographic key.

At step 29, if the first secret data provider record comprising the first cryptographic key is present in the non-volatile memory, the first cryptographic key is rendered unreadable from the non-volatile memory. This may be achieved by way of erasing and locking at least a portion of the first cryptographic key so that the true value of the first cryptographic key is hidden. For example, certain bits of the first cryptographic key may be programmed into the non-volatile memory and be in a locked state, and other bits may be in an unlocked state. All unlocked bits may be erased, that is to say they may be re-written as a '1' or a '0'. The unlocked bits may then be locked so that all bits are locked. It would be clear that after such an erase operation, the true value of the first cryptographic key would be unreadable from that point in time onwards. In one example, all unlocked '1' bits may be rewritten as '0' and all unlocked '0' bits may be rewritten as '1'.

As a result of step 29, first secret data can no longer be decrypted and authenticated as the required key (first cryptographic key) is unreadable.

Steps 28 and 29 may be swapped in order.

At step 30, if the non-volatile memory 14 comprises a temporary second secret data provider record by way of optional step 24, the secure element renders the true value of the temporary second secret data provider record unreadable by the same mechanism as for the first secret data provider record/first key in step 29.

In step 31 and subsequent activity, the secure element 12, is able to decrypt and authenticate the third secret data (which is a device specific encrypted copy of first secret data) from the non-volatile memory 14 using the second cryptographic key as required. The first secret data (originally contained within the second secret data provider record) is hence available at run-time and may be used as required by the application under execution.

Step 31 may occur after a reset of the device. The device may be considered to be operating in a normal run-mode rather than a programming mode of steps 21, 22, 22A and 25 to 30. After subsequent resets of the device, the device may begin operation in run-mode from step 31 as the first secret data has been delivered to the non-volatile memory 14 in a secure manner. Whether to begin operation from step 31 may be determined by the secure element 12 determining whether first secret data has been previously erased and locked by step 29.

As can be seen, from step 31 onwards (which is the state of the device when made available to non-secure users i.e. consumers) the secret data of the second secret data provider record (or temporary second secret data provider record) is only available within the non-volatile memory in an encrypted state whereby the encryption used is only decryptable by the secure element that encrypted the data. At no point in time has any secret data been made available outside of the device in an unencrypted (open) form, nor is the first cryptographic key for decrypting and authenticating the first secret data available anywhere in the device.

Hence secure programming of secret data has been provided without a single point of failure. An unscrupulous party would need access to the first secret data at the manufacturer premises to obtain the first cryptographic key as well as the netlist in order to manufacture the device including the secure element.

In another scenario, even if the unscrupulous party is able to read the third data from the non-volatile memory of a device in the field, and he has the netlist of the device, there is still no way of obtaining the second cryptographic key (generated from the PUF), therefore the secret data remains encrypted and hence secure.

Still further, even if the first cryptographic key is discovered, it could be changed for future device manufacture hence mitigating the security breach. For still further security, the first secret data could be delivered (step 27) or programmed (step 24) by a different manufacturer than that which manufactures (or programs) the device.

Some or all of the described methods may be implemented by a computer program. The computer program comprises computer-executable instructions or code arranged to instruct or cause a processor such as device 10 to perform one or more functions of the described methods. The computer program may be provided to an apparatus, such as device 10, on a computer readable medium or computer program product. The computer readable medium or computer program product may comprise non-transitory media such as semiconductor or solid state memory, magnetic tape, a removable computer memory stick or diskette, a random access memory (RAM), a read-only memory (ROM), a rigid magnetic disc, and an optical disk, such as a CD-ROM, CD-R/W, DVD or Blu-ray. The computer readable medium or computer program product may comprise a transmission signal or medium for data transmission, for example for downloading the computer program over the Internet.

What is claimed is:

1. A method comprising:
providing a device comprising a secure element coupled to a non-volatile memory, the non-volatile memory storing a first cryptographic key;
decrypting and authenticating, by the secure element, first secret data using the first cryptographic key to form second secret data;
rendering, by the secure element, a true value of the first cryptographic key unreadable by irreversibly changing at least a portion of the first cryptographic key by changing a state of at least one bit of the first cryptographic key and then locking the first cryptographic key to prevent further changes; and
encrypting and signing the second secret data using a second cryptographic key to form third secret data, an algorithm used to form the second secret data being different from an algorithm used to form the third secret data.

2. The method of claim 1 further storing the third secret data in the non-volatile memory, wherein the second cryptographic key is known only to the secure element.

3. The method of claim 1 further comprising deriving, by the secure element, the first cryptographic key by decrypting and authenticating cryptographic key data with a key that is hardwired into the secure element.

4. The method of claim 3 further comprising writing, by the secure element, the first cryptographic key into the non-volatile memory.

5. The method of claim 1 further comprising storing the first secret data in the non-volatile memory prior to decryption and authentication.

6. The method of claim 5 further comprising rendering, by the secure element, the true value of the first secret data unreadable by irreversibly changing at least a portion of the first data stored in the non-volatile memory.

7. The method of claim 2 further comprising providing, by the secure element, the second cryptographic key from a physically unclonable function contained therein.

8. The method of claim 2 further comprising decrypting and authenticating, by the secure element, the third secret data using the second cryptographic key.

9. A device comprising:
a non-volatile memory configured to store a first cryptographic key; and
a secure element coupled to the non-volatile memory and configured to
decrypt and authenticate first secret data using the first cryptographic key to form second secret data,
render the true value of the first cryptographic key unreadable by irreversibly changing at least a portion of the first cryptographic key by changing a state of at least one bit of the first cryptographic key and then locking the first cryptographic key to prevent further changes; and
encrypt and sign the second secret data using a second cryptographic key to form third secret data, an algorithm used to form the second secret data being different from an algorithm used to form the third secret data.

10. The device of claim 9 wherein the non-volatile memory comprises a one-time programmable memory.

11. The device of claim 9 wherein the non-volatile memory is only accessible by the secure element.

12. The device of claim 9 wherein the device is a System on Chip (SoC) device.

13. A non-transitory computer readable medium comprising instructions that when executed, cause a processor to perform the process comprising:
providing a device comprising a secure element coupled to a non-volatile memory, the non-volatile memory storing a first cryptographic key;
decrypting and authenticating, by the secure element, first secret data using the first cryptographic key to form second secret data;
rendering, by the secure element, a true value of the first cryptographic key unreadable by irreversibly changing at least a portion of the first cryptographic key by changing a state of at least one bit of the first cryptographic key and then locking the first cryptographic key to prevent further changes; and
encrypting and signing the second secret data using a second cryptographic key to form third secret data, an algorithm used to form the second secret data being different from an algorithm used to form the third secret data.

* * * * *